US009847102B2

United States Patent
Sirot et al.

(10) Patent No.: US 9,847,102 B2
(45) Date of Patent: Dec. 19, 2017

(54) METHOD AND DEVICE FOR BOUNDING AN OBJECT IN A VIDEO

(71) Applicant: THOMSON LICENSING, Issy les Moulineaux (FR)

(72) Inventors: Joel Sirot, Montreuil sur Ille (FR); Louis Chevallier, La Meziere (FR); Jean-Ronan Vigouroux, Rennes (FR)

(73) Assignee: Thomson Licensing, Issy-les-Moulineaux (FR)

( * ) Notice: Subject to any disclaimer, the term of this patent is extended or adjusted under 35 U.S.C. 154(b) by 0 days.

(21) Appl. No.: 15/155,059

(22) Filed: May 15, 2016

(65) Prior Publication Data

US 2016/0343411 A1 Nov. 24, 2016

(30) Foreign Application Priority Data

May 18, 2015 (EP) .................................... 15305735

(51) Int. Cl.
*G11B 27/00* (2006.01)
*H04N 5/93* (2006.01)
(Continued)

(52) U.S. Cl.
CPC .............. *G11B 27/34* (2013.01); *G06T 7/215* (2017.01); *G06T 7/246* (2017.01);
(Continued)

(58) Field of Classification Search
USPC .................................................. 386/278–290
See application file for complete search history.

(56) References Cited

U.S. PATENT DOCUMENTS

| 6,724,915 B1 | 4/2004 | Toklu et al. |
| 7,911,482 B1 | 3/2011 | Mariano et al. |

(Continued)

OTHER PUBLICATIONS

Ngo et al., "Video Partitioning by Temporal Slice Coherency", IEEE Transactions on Circuits and Systems for Video Technology, vol. 11, No. 8, Aug. 2001, pp. 941-953.

(Continued)

*Primary Examiner* — Hung Dang
(74) *Attorney, Agent, or Firm* — Myers Wolin LLC (57) ABSTRACT

The invention relates to a method for bounding an object in a video sequence $F_{x,y,t}$. The method includes obtaining a subset of pixels located in the object to annotate, in each frame of the video sequence. Spatio-temporal slicing is performed on the video sequence $F_{x,y,t}$, centered on the obtained subsets of pixels, resulting in a first image $F_{y,t}$ obtained by an horizontal concatenation of first slices, comprising the obtained subsets of pixels, and resulting in a second image $F_{x,t}$ obtained by a vertical concatenation of second slices. A trajectory of the obtained subsets of pixels is displayed on both the first $F_{y,t}$ and second $F_{x,t}$ image. A bounding form around the object to annotate is obtained out of four points in each frame of the video sequence, wherein the coordinates of the four points of a frame t are obtained from the coordinates of the points located in the first and second boundary of the first and second image for that frame t.

14 Claims, 6 Drawing Sheets

(51) Int. Cl.
*H04N 9/80* (2006.01)
*G11B 27/34* (2006.01)
*G06T 7/215* (2017.01)
*G06T 7/246* (2017.01)

(52) U.S. Cl.
CPC .............. *G06T 2207/10016* (2013.01); *G06T 2207/20104* (2013.01); *G06T 2207/30241* (2013.01)

(56) References Cited

U.S. PATENT DOCUMENTS

| | | | |
|---|---|---|---|
| 8,170,278 B2 | 5/2012 | Zhao et al. | |
| 8,358,808 B2 | 1/2013 | Malinovsky et al. | |
| 2006/0048191 A1* | 3/2006 | Xiong | G06F 17/30799 725/52 |
| 2012/0219174 A1* | 8/2012 | Wu | G06T 7/215 382/103 |
| 2014/0072190 A1* | 3/2014 | Wu | G06T 7/262 382/128 |

OTHER PUBLICATIONS

Ngo et al., "Motion Analysis and Segmentation Through Spatio-Temporal Slices Processing", IEEE Transactions on Image Processing, vol. 12, No. 3, Mar. 2003, pp. 341-355.
Lezama et al., "Track to the Future: Spatio-Temporal Video Segmentation with Long-Range Motion Cues", 2011 IEEE Conference on Computer Vision and Pattern Recognition (CVPR), Colorado Springs, Colorado, USA, Jun. 20, 2011, pp. 3369-3376.
Otsuka et al., "Image Velocity Estimation from Trajectory Surface in Spatiotemporal Space", 1997 IEEE Conference on Computer Vision and Pattern Recognition, San Juan, Puerto Rico, Jun. 17, 1997, pp. 200-205.
Wang et al., "Video Tooning", ACM Transaction on Graphics (TOG), vol. 23, No. 3, Aug. 31, 2004, pp. 547-583.
Ling et al., "Virtual Contour Guided Video Object Inpainting Using Posture Mapping and Retrieval", IEEE Transactions on Multimedia, vol. 13, No. 2, Apr. 2011, pp. 292-302.
Wang et al., "Video Based Real-World Remote Target Tracking on Smartphones", 2012 IEEE International Conference on Multimedia and Expo (ICME), Melbourne, Australia, Jul. 9, 2012, pp. 693-698.
Wu et al., "SAGTA: Semi-Automatic Ground Truth Annotation in Crowd Scenes", 2014 IEEE International Conference on Multimedia and Expo Workshops (ICMEW), Chengdu, China, Jul. 14, 2014, pp. 1-6.
Yang et al., "Complex Human Motion Tracking Based on Spatio-Temporal Slice Trajectory Analysis", Signal Processing, vol. 28, No. 2, Feb. 2012, pp. 246-256. English Abstract.
Du et al., "Motion Estimation of Projected Spatio-Temporal Slice for Shot Boundary Detection", 2009 7th International Conference on Information, Communications & Signal Processing (ICICS), Macau, Macau, Dec. 8, 2009, pp. 1-5.
Liu, X., "A New Approach for the Camera Motion Extraction from Texture Images with Spatio-temporal Slice Analysis", Proceedings of the 2009 2nd International Conference on Image and Signal Processing, vols. 1-9, (2009), pp. 1917-1920.
Ngo et al., "Motion Analysis and Segmentation through Spatio-temporal Slices Processing", IEEE Transactions on Image Processing, vol. 12 , No. 3, Mar. 2003, pp. 1-35.
Ricquebourg et al., "Real-Time Tracking of Moving Persons by Exploiting Spatio-Temporal Image Slices", IEEE Transactions on Pattern Analysis and Machine Intelligence, vol. 22, No. 8, Aug. 2008, pp. 797-808.
Saoudi et al., "Spatio-Temporal Video Slice Edges Analysis for Shot Transition Detection and Classification", Proceedings of World Academy of Science, Engineering and Technology, vol. 28, (2007), pp. 45-50.
Shan et al., "Adaptive Slice Representation for Human Action Classification", IEEE Transactions on Circuits and Systems for Video Technology, vol. 25, No. 10, Nov. 26, 2014, pp. 1624-1636.
Ngo et al., "Motion Characterization by Temporal Slices Analysis", 2000 IEEE Conference on Computer Vision and Pattern Recognition, Hilton Head, South Carolina, USA, Jun. 13, 2000, pp. 1-6.

* cited by examiner

Figure 4A

METHOD AND DEVICE FOR BOUNDING AN OBJECT IN A VIDEO

This application claims the benefit, under 35 U.S.C. §119 of European Patent Application No. 15305735.1, filed May 18, 2015.

1. TECHNICAL FIELD

In the following, a method for bounding a moving object in a video sequence is disclosed. Such method is useful for annotating regions or objects in a video in order to indicate their position and/or to add textual or contextual information that can be used for various purposes. This can be used for example to hide or to add blurring to an area of a video for censuring purposes. In another example annotating a region in a video allows to build a ground truth that can be used to evaluate computer vision algorithms such as object or face detection algorithms. Corresponding device is also disclosed.

2. BACKGROUND ART

This section is intended to introduce the reader to various aspects of art, which may be related to various aspects of the present invention that are described and/or claimed below. This discussion is believed to be helpful in providing the reader with background information to facilitate a better understanding of the various aspects of the present invention. Accordingly, it should be understood that these statements are to be read in this light, and not as admissions of prior art.

Video annotation is very useful for various applications, such as for example hiding or blurring moving objects for censuring purposes. It is also very useful for generating a ground truth in order to evaluate object detection algorithms in computer vision, both for training the algorithm and for testing its performance. A straight forward approach is to manually annotate each frame of a video sequence, but it can be very tedious and time consuming. When the object to annotate is pretty static, or when its shape does not vary along a video sequence, some prior art methods are known wherein a few frames are annotated and the trajectory of the object is tracked. For example U.S. Pat. No. 7,911,482 "Method and system for efficient annotation of object trajectories in image sequences" discloses a method for annotating an object in a video. The method comprises an initial temporal subsampling of the video sequence is initially performed. The subsampled image sequence is displayed in two orthogonal directions across an interactive screen. A user draws two orthogonal trajectories by tracking the object to annotate across the two orthogonal subsampled sequences via the interactive screen. The method further describes obtaining a neo trajectory that is further interpolated to the rest of the video sequence. However such method fails in precisely annotating objects of varying size and shape along a video sequence. Indeed, although the prior art methods can capture a moving object trajectory they are not able to adapt the size of the annotated region of each frame of the video to the varying size/shape of the object to annotate. Therefore, some new efficient methods are needed for automatically annotating moving objects of varying size and/or shape in video sequences, without requiring to manually edit and annotate every frame.

3. SUMMARY

A method for bounding an object in a video sequence $F_{x,y,t}$ is disclosed. The method comprises obtaining a subset of pixels located in the object to annotate, in each frame of the video sequence. Spatio-temporal slicing is performed on the video sequence $F_{x,y,t}$, centered on the obtained subsets of pixels, resulting in a first image $F_{y,t}$ obtained by an horizontal concatenation of first slices, comprising the obtained subsets of pixels, and resulting in a second image $F_{x,t}$ obtained by a vertical concatenation of second slices. A trajectory of the obtained subsets of pixels is displayed on both the first $F_{y,t}$ and second $F_{x,t}$ image. By using contour detection methods, a first and a second boundary are obtained on both the first $F_{y,t}$ and second $F_{x,t}$ image, around the trajectory of the obtained subsets of pixels. A bounding form around the object to annotate is obtained out of four points in each frame of the video sequence, wherein the coordinates of the four points of a frame t are obtained from the coordinates of the points located in the first and second boundary of the first and second image for that frame t. Advantageously, the bounding form is a rectangle drawn out of the four points, or an ellipse inscribed in that rectangle, or an ellipse comprising the four points.

According to a preferred embodiment, bounding forms are interactively fine-tuned for instance by involving a user in editing one of the first or second images $F_{y,t}$ or $F_{x,t}$, in adjusting the corresponding (first or second) trajectory of the obtained subsets, and by regenerating the other image, $F_{y,t}$ or $F_{x,t}$, automatically. More precisely the method further comprises adjusting the trajectory of the subsets of pixels in the first image, obtaining an updated version of the second image, obtaining an updated version of the second trajectory, obtaining an updated version of the first and second boundary around the updated version of the second trajectory on the updated version of the second image, and obtaining an updated version of the bounding form around the object.

According to a particularly advantageous variant, the first slices are vertical slices, and the second slices are horizontal slices.

According to a particularly advantageous variant, each of the first slices is inclined with respect to the vertical, and its inclination is constant for a set of successive frames of the video sequence.

According to a particularly advantageous variant, the inclination of the first slices with respect to the vertical is adjustable by a user on a plurality of frames of the video sequence, and the inclination Is further interpolated to the rest of the frames of the video sequence.

According to a particularly advantageous variant, the subset a pixel is selected among:
  a single pixel,
  a block of four pixels,
  a block of eight pixels,
  a block of sixteen pixels.

In a second aspect, a device for bounding an object in a video sequence from a subset of pixels per frame is also disclosed. The device comprises a processor configured to:
  obtain a first image from a first spatio-temporal slicing, wherein the first image is an horizontal concatenation of first slices comprising the subset of pixels for frames along the video sequence;
  obtain a second image from a second spatio-temporal slicing, wherein the second image is a vertical concatenation of second slices comprising the subset of pixels for frames along the video sequence, each of the second slices being orthogonal to the first slice of a same frame;
  obtain a first and a second trajectory of the subsets of pixels per frame on each of the first and second images;

obtain on each of the first and second images a first and second boundary around the first and second trajectory by means of a contour detection method;

obtain a bounding form out of four points, around the object in each frame of the video sequence, wherein the coordinates of the four points in a frame t are obtained from the coordinates of the points located in the first and second boundary of the first and second image for that frame t.

In a third aspect, a computer program for bounding an object in a video sequence from a subset of pixels per frame is also disclosed. The computer program comprises program code instructions executable by a processor for:

obtaining a first image from a first spatio-temporal slicing, wherein the first image is an horizontal concatenation of first slices comprising the subset of pixels for frames along the video sequence;

obtaining a second image from a second spatio-temporal slicing, wherein the second image is a vertical concatenation of second slices comprising the subset of pixels for frames along the video sequence, each of the second slices being orthogonal to the first slice of a same frame;

obtaining a first and a second trajectory of the subsets of pixels per frame on each of the first and second images;

obtaining on each of the first and second images a first and second boundary around the first and second trajectory by means of a contour detection method;

obtaining a bounding form out of four points, around the object in each frame of the video sequence, wherein the coordinates of the four points in a frame t are obtained from the coordinates of the points located in the first and second boundary of the first and second image for that frame t.

In a fourth aspect, a computer program product for bounding an object in a video sequence from a subset of pixels per frame is also disclosed. The computer program product is stored on a non-transitory computer readable medium, and comprises program code instructions executable by a processor for:

obtaining a first image from a first spatio-temporal slicing, wherein the first image is an horizontal concatenation of first slices comprising the subset of pixels for frames along the video sequence;

obtaining a second image from a second spatio-temporal slicing, wherein the second image is a vertical concatenation of second slices comprising the subset of pixels for frames along the video sequence, each of the second slices being orthogonal to the first slice of a same frame;

obtaining a first and a second trajectory of the subsets of pixels per frame on each of the first and second images;

obtaining on each of the first and second images a first and second boundary around the first and second trajectory by means of a contour detection method;

obtaining a bounding form out of four points, around the object in each frame of the video sequence, wherein the coordinates of the four points in a frame t are obtained from the coordinates of the points located in the first and second boundary of the first and second image for that frame t.

While not explicitly described, the present embodiments may be employed in any combination or sub-combination. For example, the invention is not limited to the described subset of pixels and bounding form variants, and any arrangement of subset of pixels or bounding form variant can be used. Moreover the invention is not limited to the described spatio temporal slicing characteristics and other means for adjusting the slice inclination throughout the video sequence can be used.

Besides, any characteristic or embodiment described for the bounding method is compatible with a device intended to process the disclosed method and with a computer-readable storage medium storing program instructions.

5. DESCRIPTION OF EMBODIMENTS

Figure 1:
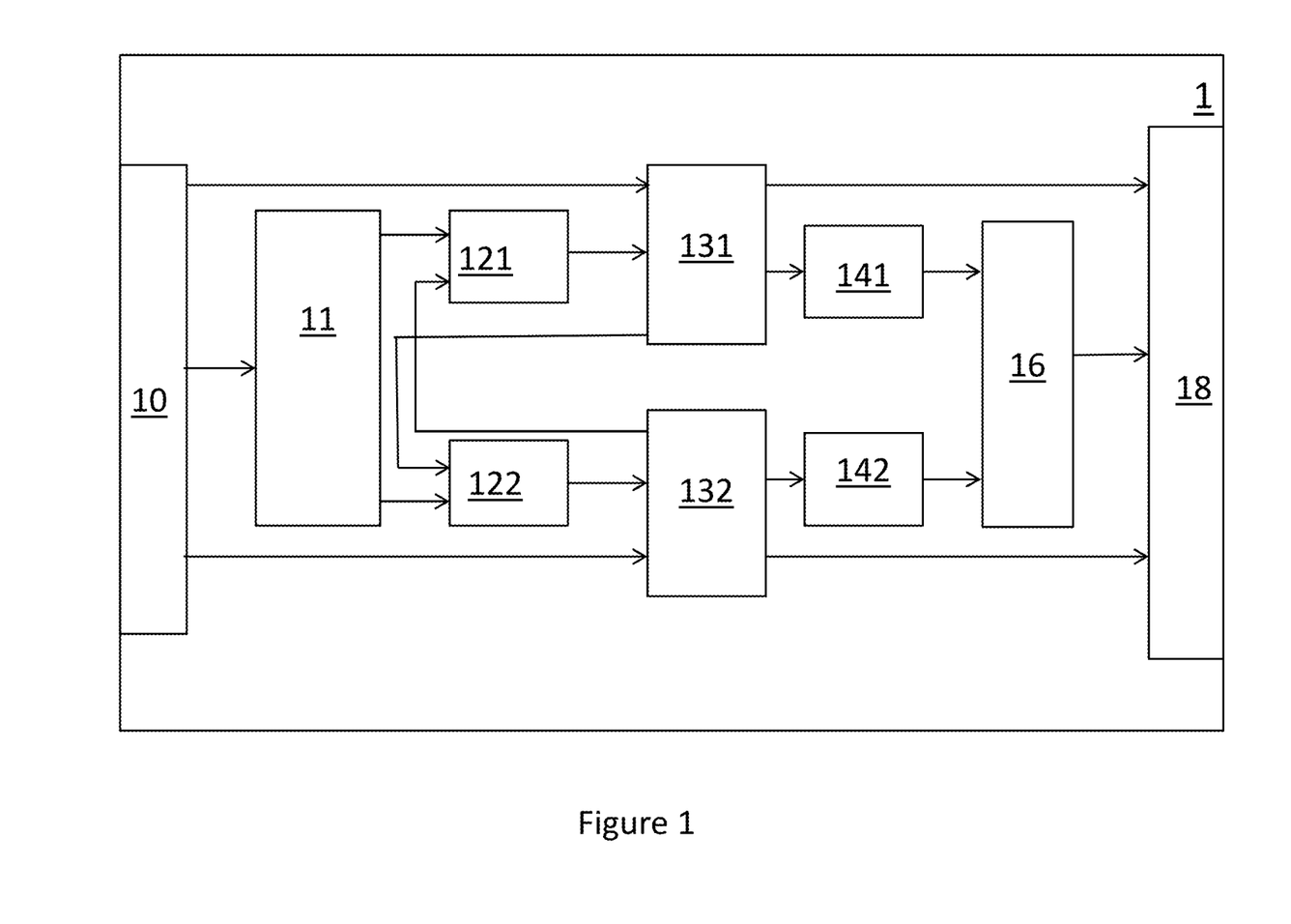
FIG. 1 depicts a processing device for bounding an object in a video according to a specific and non-limitative embodiment of the invention.

FIG. 1 depicts a processing device 1 for bounding an object in a video sequence $F_{x,y,t}$ where a subset of pixels is obtained per frame of the video sequence $F_{x,y,t}$. According to a specific and non-limitative embodiment of the invention, the processing device 1 comprises an input 10 configured to receive a video sequence. The video sequence is obtained from a source. According to different embodiments of the invention, the source belongs to a set comprising:

- a local memory, e.g. a video memory, a RAM, a flash memory, a hard disk, an SD card;
- a storage interface, e.g. an interface with a mass storage, a ROM, an optical disc or a magnetic support;
- a communication interface, e.g. a wireline interface (for example a bus interface, a wide area network interface, a local area network interface) or a wireless interface (such as a IEEE 802.11 interface Bluetooth interface, cellular mobile phone interface).

The input 10 is further configured to receive selection data from a user on a frame. Selection data are generated by a user via a selection mean (not represented) in order to obtain a subset a pixels comprised in the object to annotate. According to different embodiments of the invention, the selection mean belongs to a set comprising:

- a touch screen sensor and its accompanying controller based firmware able to select a subset of pixels in at least one frame of the video sequence, in conjunction with an external object such as a stylus or a finger;
- a mouse combined to other input signals (such as some keys of a keyboard), and associated to some video display capability so as to select a subset of pixels in at least one frame of the video sequence.

More generally any selection mean allowing to obtain a subset of pixels comprised in an object to annotate in at least one frame of the video sequence is compatible with this invention.

The input 10 is linked to a processing module 11 configured to obtain a subset of pixels from the selection data that represents a location comprised in an object to annotate in at least one frame of a video sequence, wherein the at least one frame of the video sequence results from a temporal sub-sampling of the video sequence. Advantageously the processing module 11 is configured to obtain a subset of pixels in each frame of the video sequence by interpolating the selected subsets of pixels of the subsampled frames to the rest of the frames. In a variant, the processing module 11 is external to the device 1, and in such a case, the subsets of pixels per frame of the video sequence are received by the device 1 via the input 10. The processing module 11 is linked to two spatio temporal slicing modules 121 and 122 configured to obtain a first and a second image. The first image is obtained from the spatio temporal slicing module 121 by a horizontal concatenation of first slices, wherein a first slice comprises the subset of pixels obtained for a frame of the video sequence by the processing module 11. The second image is obtained from the spatio temporal slicing module 122 by a vertical concatenation of second slices, wherein a second slice comprises the subset of pixels obtained for a frame of the video sequence by the processing module 11, and wherein each of the second slices is orthogonal to the first slice of the same frame along the video sequence.

Each of the spatio temporal slicing modules 121 and 122 is respectively linked to a processing module 131 and 132 configured to respectively obtain a first and a second trajectory, respectively on the first and the second image. More precisely, the processing module 131 is configured to concatenate the areas occupied by the subsets of pixels along the horizontally concatenated slices of the first image, resulting in a first trajectory. Similarly, the processing module 132 is configured to concatenate the areas occupied by the subsets of pixels along the vertically concatenated slices of the second image, resulting in a second trajectory. According to a particular embodiment the resulting first and second trajectories together with the first and second images are sent by the processing modules 131 and 132 to an output 18, such as a display mean. The first trajectory of the subsets of pixels and the second trajectory of the subsets of pixels are displayed respectively with the first and the second image on a display mean. A user may decide to adjust the position of either the first or the second trajectory of the subsets of pixels on the corresponding (either first or second) image, and the other image (either the second or the first) is re-computed. For example the user decides to adjust the first trajectory on the first image. This is done by sending selecting data via a selecting mean to the processing module 131, that sends modified images to a display mean via the output 18. The processing module 131 sends the adjusted trajectory of the subsets of pixels to the spatio temporal slicing module 122 configured to re-compute the second image from a vertical concatenation of second slices comprising the subset of pixels obtained from the updated trajectory for frames along the video sequence. The recomputed second image is sent to the processing module 132 for obtaining an updated trajectory of the subsets of pixels on the second image. The resulting re-computed second image and updated second trajectory are sent to the output 18 and displayed to the user. A similar process where a user adjusts the position of the second trajectory of the subsets of pixels on the second image, and the first image is re-computed is also applicable.

Each of the processing modules 131 and 132 is respectively linked to a processing module 141, 142 configured to obtain respectively a first and a second boundary around its corresponding first or second trajectory. In other words the processing modules 131 sends data corresponding to the first image and the first trajectory of the subsets of pixels to the processing module 141 configured to obtain a first and a second boundary around the first trajectory. Similarly the processing modules 132 sends data corresponding to the second image and the second trajectory of the subsets of pixels to the processing module 142 configured to obtain a first and a second boundary around the second trajectory.

Each of the processing modules 141 and 142 respectively sends the first and the second image as well as data corresponding the its first and second boundary to the processing module 16 configured to obtain a bounding form around the object to annotate. The bounding form is obtained in each frame of the video sequence, out of 4 points per frame, wherein the coordinates (X,Y) of the four points in a frame t are obtained from the coordinates of the points located in the first and second boundary of the first and second image for that frame t. According to a particular embodiment the processing module 16 sends the resulting annotated video sequence to the video output 18, wherein an object of the video sequence is bounded by the obtained bounding form in each frame.

According to a particular embodiment the display mean is external to the device and the output 18 sends the data to display to an external display mean. According to different embodiments of the invention, the display mean, internal or external, belongs to a set comprising:

a personal computer screen;
a TV screen;
a tablet;
a smartphone screen.

More generally any display mean allowing to display a bounding form around an object to annotate in a video sequence is compatible with this invention.

In a variant, the bounding form and/or its corresponding four point coordinates are stored in a memory. As an example, such information is stored in a remote or in a local memory, e.g. a video memory or a RAM, a hard disk.

Figure 2:
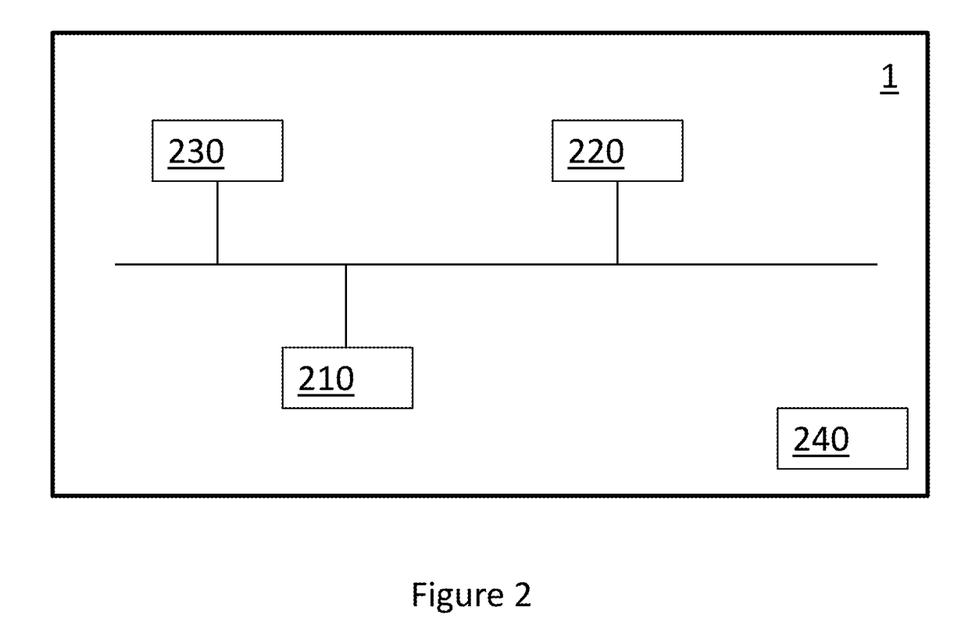
FIG. 2 represents an exemplary architecture of the processing device of FIG. 1 according to a specific and non-limitative embodiment of the invention.

FIG. 2 represents an exemplary architecture of the processing device 1 according to a specific and non-limitative embodiment of the invention, where the processing device 1 is configured to bound an object in a video sequence. The memory stores the frames of the video sequence comprising the object to annotate. The processing device 1 comprises one or more processor(s) 210, which is(are), for example, a CPU, a GPU and/or a DSP (English acronym of Digital Signal Processor), along with internal memory 220 (e.g. RAM, ROM, EPROM). The processing device 1 comprises one or several Input/Output interface(s) 230 adapted to send to display output information and/or to allow a user to enter commands and/or data (e.g. a keyboard, a mouse, a touchpad, a webcam, a display), and/or to send/receive data over a network interface; and a power source 240 which may be external to the processing device 1.

According to an exemplary and non-limitative embodiment of the invention, the processing device 1 further comprises a computer program stored in the memory 220. The computer program comprises instructions which, when executed by the processing device 1, in particular by the processor 210, make the processing device 1 carry out the processing method described with reference to FIG. 3. According to a variant, the computer program is stored externally to the processing device 1 on a non-transitory digital data support, e.g. on an external storage medium such as a SD Card, HDD, CD-ROM, DVD, a read-only and/or DVD drive and/or a DVD Read/Write drive, all known in the art. The processing device 1 thus comprises an interface to read the computer program. Further, the processing device 1 could access one or more Universal Serial Bus (USB)-type storage devices (e.g., "memory sticks.") through corresponding USB ports (not shown).

According to exemplary and non-limitative embodiments, the processing device 1 is a device, which belongs to a set comprising:
- a mobile device;
- a communication device;
- a game device;
- a tablet (or tablet computer);
- a smartphone;
- a laptop;
- a still picture camera;
- a video camera;
- a still picture server;
- a video server (e.g. a broadcast server, a video-on-demand server or a web server).

Figure 3:
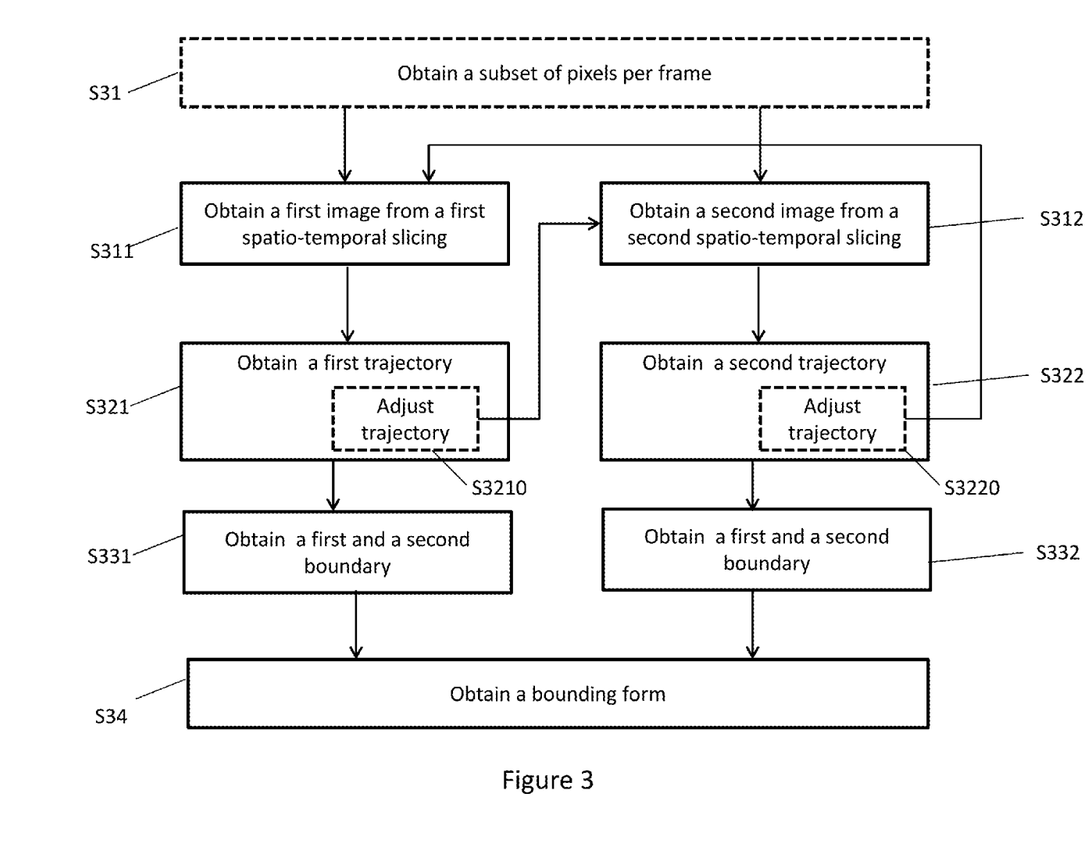
FIG. 3 illustrates the method for bounding an object in a video according to a preferred embodiment.

FIG. 3 illustrates a method for bounding an object in a video sequence according to a preferred embodiment. Without any limitation or loss of generality, but in order to increase the clarity, and as described in FIGS. 4A-4C, the video sequence 40 is considered as a volume of three dimensions (x,y,t), where (x,y) represents the spatial dimensions of a frame 400, and t represents the temporal dimension. The volume can also be viewed as formed by a set of spatio-temporal 2D cuts, each with dimensions (x,t) or (y,t), wherein a spatio temporal 2D cut is a concatenation of 1D slices, also called straight slices in the same selected position of every frame by increasing value of time.

Obtaining a 3D Trajectory of Subsets of Pixels

Figure 4A:
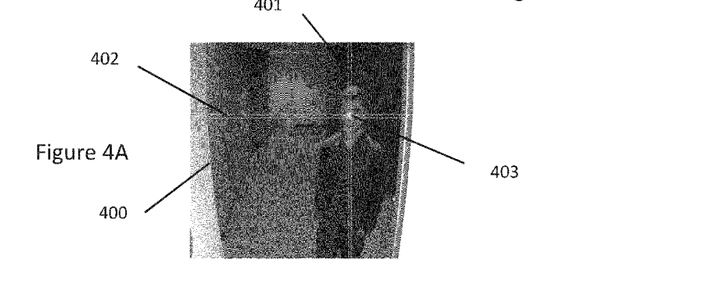
FIGS. 4A-4C illustrate an example of a video sequence, an example of a subset of pixels selection, and an example of slicing according to a preferred embodiment.

In the step S31, shown in FIG. 4A, a subset 403 of pixels is obtained in at least one frame 400 of the video sequence 40 according to selection data received from a selection mean. A user visualizing at least one frame 400 of the video sequence 40 selects a portion of the visualized at least one frame, located for example approximately in the center of an object to annotate, by using a selection mean, such as for example a mouse or a stylus on a touch screen. In a first variant the obtained subset 403 of pixels on the at least one frame 400 corresponds to the pixels comprised in the selected area of the frame 400. In a second variant the obtained subset 403 of pixels on the at least one frame 400 corresponds to a single pixel, located at the center of the selected area of the frame 400. In another variant, the obtained subset 403 of pixels on the at least one frame 400 corresponds to a block of four pixels located at the center of the selected area of the frame 400. In yet another variant, the obtained subset 403 of pixels on the at least one frame 400 corresponds to a block of eight or sixteen pixels located at the center of the selected area of the frame 400. More generally, any block size and form obtained from the selected area is compatible with the disclosed method.

Figure 4B:
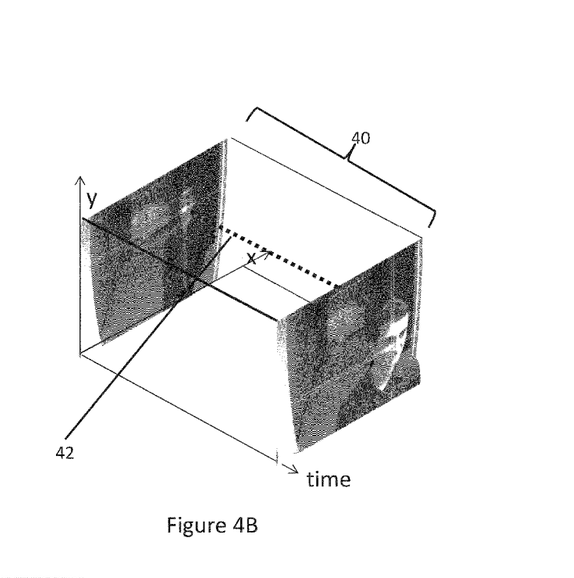

In a first embodiment, a subset 403 of pixels is selected in a single frame 400 from selection data received from a user and according to any variant described above. A subset 403 of pixels per frame, called initial 3D trajectory 42, shown in FIG. 4B, is obtained by interpolating the position of the subset 403 of pixels, obtained for one frame 400 to all the frames of the sequence 40 following straight lines along the temporal axis in the volume corresponding to the video sequence 40. This is advantageous in the sense that a single manual annotation is required from a user to obtain an initial 3D trajectory that can then be fine-tuned following an interactive process described later.

Figure 4C:
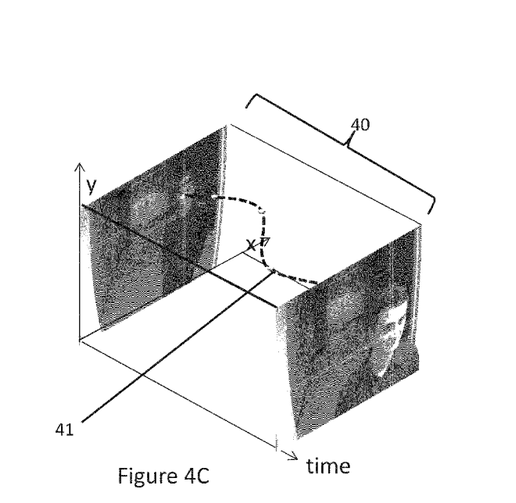

In a second embodiment, the video sequence is temporally subsampled into a plurality of frames 400 that are manually annotated by a user, resulting in a plurality of subsets 403 of pixels obtained from selection data received from a user according to any variant described above. A subset 403 of pixels per frame 400 is obtained by interpolating the subsampled positions of the subsets of pixels to the rest of the frames, resulting in an initial 3D trajectory 41 as illustrated in FIG. 4C.

Spatio-Temporal Splicing

Figure 5A:
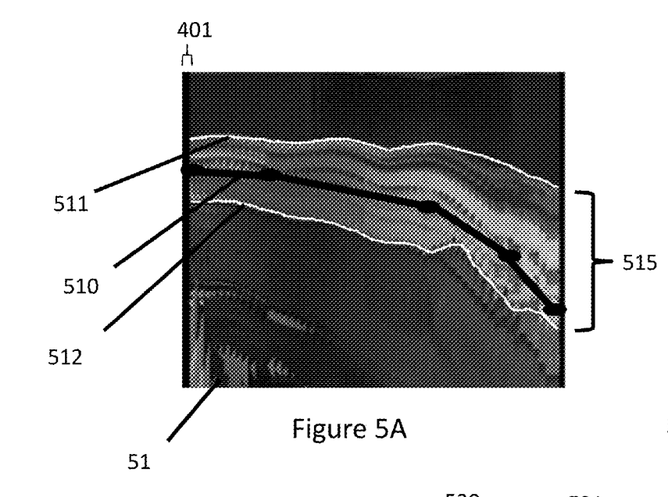
FIGS. 5A-5E illustrate an example of spatio temporal slicing results, and an example of a bounding form according to a preferred embodiment.

In the step S311, a first image 51, as shown in FIG. 5A, is obtained from a first spatio-temporal slicing wherein at least one first slice 401 is obtained in each frame of the video sequence 40 and wherein a first slice 401 of a frame is a straight slice, characterized by an inclination with respect to the vertical, a width and the obtained subset 403 of pixels for that frame. Advantageously the first slice 401 width is exactly the width of the obtained subset 403 of pixels. But another width, being smaller or larger than the obtained subset 403 width is also compatible with the disclosed method. Advantageously each of the first slices 401 is a vertical slice, as depicted in FIG. 4A. The obtained first slices 401 for all frames of the video sequence are horizontally concatenated, from left to right by increasing value of time t resulting in a first image 51 as shown in FIG. 5A. A horizontal concatenation of the first slices 401 from right to left by increasing value of time t is a possible variant of the method. The abscise of the first image 51 is the time t of the video sequence 40, and for a given value of t the ordinate of the first image 51 corresponds the first slice 401 of the video sequence at that time t. In other words, the first image 51 can be seen as a cut in the video sequence volume 40 following the obtained 3D trajectory 41, 42 of the subsets of pixels and the inclination of the first slice 401. As further detailed later, the disclosed spatio temporal slicing is advantageous in the sense that the cut is not linear (the inclination of first slices with respect to the vertical changes over time).

Figure 5B:
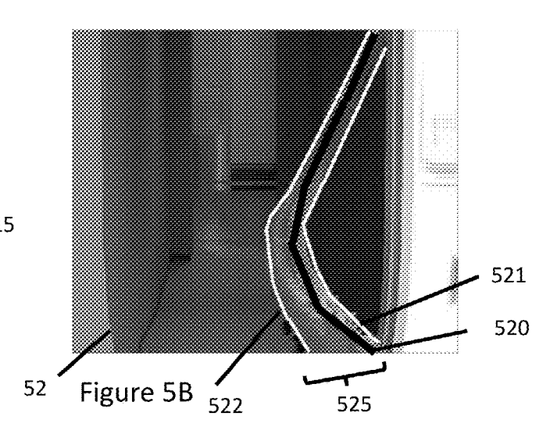

Similarly in the step S312, a second image 52, as shown in FIG. 5B, is obtained from a second spatio-temporal slicing wherein at least one second slice 402 is obtained in each frame of the video sequence, wherein a second slice 402 of a frame is a straight slice, orthogonal to the first slice 401 of the same frame, further characterized by a width and the obtained subset 403 of pixels for that frame. In case a first slice 401 is vertical, the corresponding second slice 402 is horizontal as shown in FIG. 4A. The orthogonality between the first 401 and second 402 slices is an essential characteristic while fine tuning the 3D trajectory of the subsets of pixels in an interactive process as described later. Advantageously the second slice 402 width is exactly the width of the obtained subset 403 of pixels. But another width, being smaller or larger than the obtained subset 403 width is also compatible with the disclosed method. The obtained second 402 slices for all frames 400 of the video sequence 40 are vertically concatenated, from the top to the bottom by increasing value of time t resulting in a second image 52 as shown in FIG. 5B. A vertical concatenation of the second slices from the bottom to the top by increasing value of time t is a possible variant of the method. The ordinate of the second image 52 is the time t of the video sequence, and for a given value of t, the abscise of the second image 52 corresponds to the second slice 402 of the video sequence at that time t. In other words, the second image 52 can be seen as a cut in the video sequence volume 40 following the obtained 3D trajectory 41, 42 of the subsets of pixels and the inclination of the second slice 402.

More formally:

Considering the video sequence $F_{x,y,t}$ as a cube of pixels where a pixel is defined by its coordinates (x,y,t) in the cube.

Let $T_t=(x,y)$ be the 3D trajectory function, giving the coordinates (x,y) of a pixel located at the center of to the subset of pixels at time t.

Let $T_t \cdot x=x$ be the projected 3D trajectory function, giving the coordinates (x) of a pixel located at the center of to the subset of pixels at time The first image 51 can be viewed as a matrix I, being the set of pixels: $I_{a,b}=F_{T_a \cdot x,b,a}$ The second image 52 can be viewed as a matrix J being the set of pixels: $J_{a,b}=F_{a,T_b \cdot y,b}$ Where a and b are the indexes corresponding to the horizontal and vertical axes respectively for the matrixes I and J.

Obtaining Boundaries

In the step S321, a first trajectory 510, as shown in FIG. 5A is obtained on the first image 51, by concatenating the areas occupied by the subsets of pixels along the horizontally concatenated first slices 401 of the first image 51. The first trajectory 510 is different from the 3D-trajectory 41, 42 described previously as it belongs to the first image 51. The first trajectory 510, being the trajectory of the subsets of pixels on the first image 51, represents the center of the object to annotate. If the subsets of pixels are well positioned inside the object to annotate along the video sequence, and when the object to annotate is clearly visible along the video sequence, a band 515 is clearly visible on the first image 51.

In the step S331, a first boundary 511 and a second boundary 512 are obtained around the first trajectory 510 on the first image 51, resulting in a first band 515. In a first variant, the first 511 and second 512 boundaries are positioned around the first trajectory 510 by a user via a selection mean. In a second variant, the first 511 and second 512 boundaries are positioned around the first trajectory 510 by automatic contour detection techniques. Advantageously a combination of both manual and automatic techniques are used to obtain the first 511 and second 512 boundaries around the first trajectory 510 on the first image 51.

Similarly in the step S322, a second trajectory 520, as shown in FIG. 5B is obtained on the second image 52, by concatenating the areas occupied by the subsets of pixels along the vertically concatenated second slices 402 of the second image 52. The second trajectory 520 is different from the 3D trajectory 41, 42 described previously as it belongs to the second image 52. The second trajectory 520, being the trajectory of the subsets of pixels on the second image 52 represents the center of the object to annotate. Here also, if the subsets of pixels are well positioned inside the object to annotate along the video sequence, and when the object to annotate is clearly visible along the video sequence, a band 525 is clearly visible on the second image 52.

In the step S332, a first boundary 521 and a second boundary 522 are obtained around the second trajectory 520 on the second image 52, resulting in a second band 525. In a first variant, the first 521 and second 522 boundaries are positioned around the second trajectory 520 by a user via a selection mean. In a second variant, the first 521 and second 522 boundaries are positioned around the second trajectory 520 by automatic contour detection techniques. Advantageously a combination of both manual and automatic techniques are used to obtain the first 521 and second 522 boundaries, around the second trajectory 520 on the second image 52

Interactive Fine-Tuning

In the sub-step S3210 of the step S321, the first trajectory 510 is adjusted on the first image 51, for example by a user via selection mean. The modification of the position of the first trajectory 510 on the first image 51 generates modifications of the positions of the corresponding subsets 403 of pixels along the direction of the first slice of that frame in the video sequence volume 40. In other words, adjusting the first trajectory 510 on the first image 51 allows to adjust the 3D trajectory of the subsets 403 of pixels in the video sequence 40. Thanks to the orthogonality between the first and the second slices, adjusting the first trajectory 510 on the first image 51 does not generate a change in the second trajectory 520 on the second image 52. However, since the 3D trajectory of the subsets of pixels has evolved, along the direction of first slices, the second image 52 can be advantageously regenerated. An updated version of the second image 52 is obtained from a second spatio temporal slicing in a step S312, based on the updated 3D trajectory of the subsets 403 of pixels. The sequence of adjusting S3210 the first trajectory 510 on the first image 51, obtaining S312 a second image 52 from a second spatio temporal slicing on the updated subsets of pixels, obtaining S322 a second trajectory 520 on the second image 52 can be repeated several times so as to fine tune the first 510 and second 520 trajectories on the first 51 and second 52 images, resulting in an interactive process.

Symmetrically in the sub-step S3220 of the step S322, the second trajectory 520 is adjusted on the second image 52, for example by a user via selection mean. The modification of the position of the second trajectory 520 on the second image 52 also generates modifications of the positions of the corresponding subsets on pixels along the direction of the second slice of that frame in the video sequence 40. This results in an updated 3D trajectory of the subsets on pixels. An updated version of the first image 51 is obtained from a first spatio temporal slicing in a step S311, based on the updated 3D trajectory of the subsets of pixels. The sequence of adjusting S3220 the second trajectory 520 on the second image 52, obtaining S311 a first image 51 from a first spatio temporal slicing on the updated 3D trajectory of the subsets of pixels, obtaining S321 a first trajectory 510 on the first image 51 can be repeated several times so as to fine tune the first 510 and second 520 trajectories on the first 51 and second 52 images.

Advantageously interactive fine-tuning a first 515 and a second 525 band on the first 51 and second 52 images is done by alternatively adjusting S3210 the first 510 trajectory and obtaining S312 the second image on the one hand and adjusting S3220 the second 520 trajectory and obtaining S311 the first image on the other hand.

Advantageously interactive fine-tuning a first and a second band on the first 51 and second 52 images also comprises obtaining S331 a first 511 and a second 512 boundary around the first trajectory 510, and obtaining S332 a first 521 and a second 522 boundary around the second trajectory 520.

Obviously, the skilled in the art will also be able to obtain on each of the first (51) and second (52) images a first (511, 521) and a second (512, 522) boundary around the subsets (403, 603) of pixels per frame by means of a contour detection method, skipping obtaining the first and second trajectories and the interactive fine-tuning.

Obtaining a Bounding Form

Figure 5C:
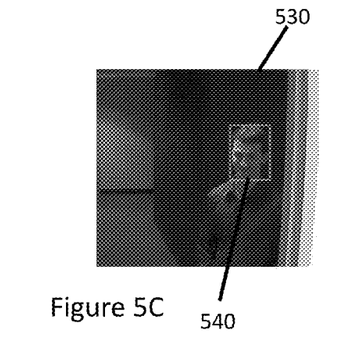
Figure 5D:
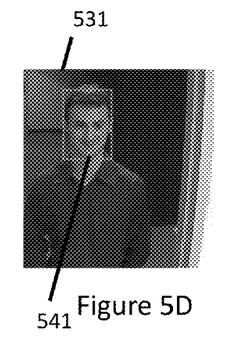
Figure 5E:
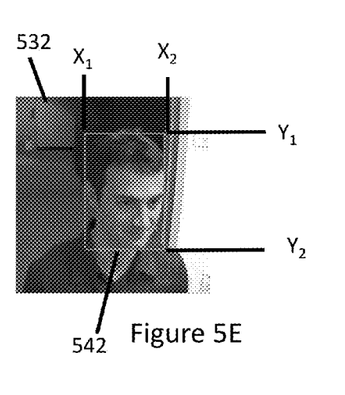

In the step S34 a bounding form 540, 541, 542, shown in FIGS. 5C-5E, is obtained out of four points, around an object to annotate, in each frame 530, 531, 532 of the video sequence, wherein the coordinates (X,Y) of the four points in a frame t are obtained from the coordinates of the points located in the first 511, 521 and second 512, 522 boundaries of the first 51 and second 52 image for that frame t. In other words from the first image 51, at any value of t, two values $Y_1$ and $Y_2$ are obtained from the points located in the first 511 and second 512 boundaries for that value of t. Similarly, from the second image 52 and for the same value of t, two values $X_1$ and $X_2$ are obtained from the points located in the first 521 and second 522 boundaries. For the frame t, the coordinates of the four points are $(X_1,Y_1)$, $(X_2,Y_2)$, $(X_1,Y_2)$ and $(X_2,Y_1)$. In a first variant the bounding form is a rectangle drawn from the four points. In a second variant, the bounding form is the inscribed ellipse of a rectangle drawn from the four points. In yet another variant, the bounding form is an ellipse comprising the four points. Bounding an object with an ellipse is advantageous when the object is for example a human face.

Figure 6A:
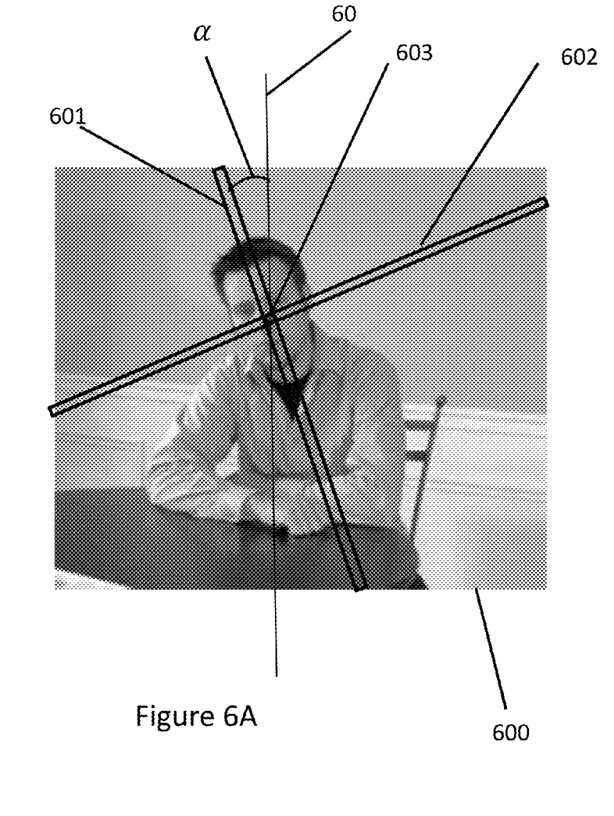
FIGS. 6A-6B illustrate an example of slicing and bounding according to an alternate embodiment.
Figure 6B:
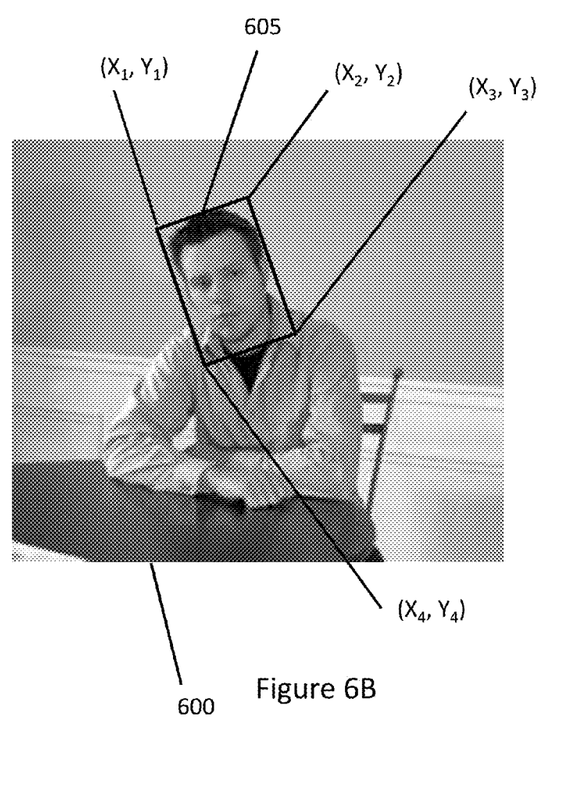

FIGS. 6A-6B illustrate the method for bounding an object in a video sequence according to an alternate embodiment, wherein a first slice 601 is inclined with respect to the vertical 60 from an angle $\alpha$. In this embodiment, the second slices 602, being orthogonal to the first slices 601, are also inclined with respect to the horizontal from the same angle $\alpha$. In this embodiment first slices 601 are not necessarily vertical and second slices 602 are not necessarily horizontal. Despite this characteristic (the verticality of the first slices and the horizontality of the second slices), all the variants described above are applicable. The bounding form 605 around the object to annotate in a frame 600, drawn out of four points as previously described in the step S34, is inclined with respect to the vertical from the same angle as the first slice 601 for the same frame 600.

More precisely, the bounding form 605 around the object to annotate is obtained out of four points extracted from the first and the second image, wherein the coordinates (X,Y) of the four points in a frame t of the video sequence are obtained from the coordinates of the points located in the first and second boundaries of the first and second image for that frame t.

Let $Y'_1$ and $Y'_2$ be the two values obtained from the points located in the first and second boundaries of the first image for any value of t.

Similarly, let $X'_1$ and $X'_2$ the two values obtained from the points located in the first and second boundaries of the second image for any value of t. For a frame t, four points are obtained with the following coordinates $(X'_1,Y'_1)$, $(X'_2,Y'_2)$, $(X'_1,Y'_2)$ and $(X'_2,Y'_1)$.

A rotation centered in the subset 603 of pixels for a frame and from the inverse angle corresponding to the inclination of the first slice 601 for that frame t, is then applied to each of these four points $(X'_1,Y'_1)$, $(X'_2,Y'_2)$, $(X'_1,Y'_2)$ and $(X'_2,Y'_1)$, resulting in the four points $(X_1,Y_1)$, $(X_2,Y_2)$, $(X_3,Y_3)$ and $(X_4,Y_4)$, from which a bounding form is obtained.

NB: considering $\alpha$ is the angle corresponding to the inclination of the first slice with respect to the vertical, the inverse angle is $-\alpha$.

More formally:

Let $R_t=(c_x, c_y, \alpha)$ be the rotation centered in the point of coordinates $(c_x, c_y)$ of the angle $(\alpha)$ Let $-R_t=(c_x, c_y, -\alpha)$ be the rotation centered in the point of coordinates $(c_x, c_y)$ of angle $(-\alpha)$ corresponding to the inverse angle.

Let Rotate(I,r) the function that applies the rotation r to the image I.

Considering the video sequence $F_{x,y,t}$ as a cube of pixels where a pixel is defined by its coordinates (x,y,t) in the cube, $F'_{x',y',t}$ is defined as a rotated cube of pixel obtained from a rotation centered in the subset 603 of pixel for each frame: Rotate($F_{x,y,t}$, $R_t$)=$F'_{x',y',t}$, where $R_t=(c_x, c_y, \alpha)$ and $(c_x, c_y)$ are the coordinates of the center of the subset 603 of pixels, and $\alpha$ is the inclination of the first slice 601 with respect to the vertical.

In the case a first slice 601 is inclined of angle $\alpha$ with respect to the vertical 60, the first and second spatio temporal slicing is applied in the rotated cube of pixels $F'_{x',y',t}$. The coordinates obtained from the points located in the first and second boundaries of the first and second images correspond to the rotated cube $F'_{x',y',t}$.

The four points, of coordinates $(X_1,Y_1)$, $(X_2,Y_2)$, $(X_3,Y_3)$ and $(X_4,Y_4)$, from which a bounding form is drawn, are obtained by applying the rotation $-R_t=(c_x, c_y, -\alpha)$ to the points located in the first and second boundaries of the first and second images:

$$(X_k,Y_k)=\text{Rotate}((X'_i, Y'_j), -R_t) \text{ with } k\in\{1,2,3,4\}, i\in\{1,2\}, j\in\{1,2\}$$

In a first variant, the inclination $\alpha$ of the first 601 slices with respect to the vertical is constant for the video sequence. Advantageously, the inclination $\alpha$ varies along the video sequence and depends on the variations of the inclination and the geometry of the object to annotate along the video sequence. Advantageously the inclination $\alpha$ is adjusted along the time of the video sequence by a user as part of the interactive trajectory fine tuning process. For example, the inclination $\alpha$ is adjusted by a user on a plurality of sub-sampled frames, and the inclination $\alpha$ is interpolated to the rest of the frames.

The invention claimed is:

1. A method, comprising:
    obtaining a position of a first subset of pixels in an object in at least one frame of a video sequence according to selection data received from a user interface;
    obtaining a subset of pixels per frame of the video sequence, resulting in a plurality of subsets of pixels, by interpolating the position of the first subset of pixels to the video sequence;
    obtaining a first image from a first spatio-temporal slicing, wherein said first image is a horizontal concatenation of first slices comprising the subset of pixels for frames along said video sequence;
    obtaining a second image from a second spatio-temporal slicing, wherein said second image is a vertical concatenation of second slices comprising the subset of pixels for said frames along said video sequence, each of said second slices being orthogonal to the first slice of a same frame;
    obtaining on each of said first and second images a first and a second boundary around the plurality of subsets of pixels per frame by means of a contour detection method;
    wherein the coordinates of said four points in a frame t are obtained from the coordinates of the points located in the first and second boundary of the first and second image for that frame t.

2. The method according to claim 1, wherein each of said first slices is a vertical slice.

3. The method according to claim 1, wherein said subset of pixels is selected among:
    a single pixel,
    a block of four pixels,
    a block of eight pixels,
    a block of sixteen pixels.

4. The method according to claim 1, wherein said bounding form is selected among:
- a rectangle drawn out of said four points,
- an ellipse comprising said four points,
- the inscribed ellipse of a rectangle drawn out of said four points.

5. The method according to claim 1, further comprising obtaining a first and a second trajectory of the subsets of pixels per frame on each of said first and second images, adjusting the trajectory of said subsets of pixels in said first image, obtaining an updated version of said second image, obtaining an updated version of said second trajectory, obtaining an updated version of said first and second boundary around said updated version of said second trajectory on said updated version of said second image, and obtaining an updated version of said bounding form around said object.

6. The method according to claim 5, wherein said first trajectory is adjusted by a user.

7. The method according to claim 1, wherein each of said first slices is inclined with respect to the vertical.

8. The method according to claim 7, wherein the inclination α of said first slices with respect to the vertical, is constant for a set of successive frames of said video sequence.

9. The method according to any of claims 7 to 8, wherein the inclination α of said first slices with respect to the vertical is adjustable by a user for a set of successive frames of said video sequence.

10. The method according to any of claims 7 to 8, wherein the inclination α of the first slice with respect to the vertical, is adjustable by a user on a plurality of frames of said video sequence, said inclination α being interpolated to the rest of the frames of said video sequence.

11. A device configured to:
- obtain a position of a first subset of pixels in an object in at least one frame of a video sequence according to selection data received from a user interface;
- obtaining a subset of pixels per frame of the video sequence, resulting in a plurality of subsets of pixels, by interpolating the position of the first subset of pixels to the video sequence;
- obtain a first image from a first spatio-temporal slicing, wherein said first image is a horizontal concatenation of first slices comprising the subset of pixels for frames along said video sequence;
- obtain a second image from a second spatio-temporal slicing, wherein said second image is a vertical concatenation of second slices comprising the subset of pixels for said frames along said video sequence, each of said second slices being orthogonal to the first slice of a same frame;
- obtain on each of said first and second images a first and second boundary around the plurality of subsets of pixels by means of a contour detection method;
- obtain a bounding form out of four points, around said object in each frame of the video sequence, wherein the coordinates of said four points in a frame t are obtained from the coordinates of the points located in the first and second boundary of the first and second image for that frame t.

12. The device according to claim 11, wherein each of said first slices is inclined with respect to the vertical.

13. The device according to claim 12, wherein the inclination α of said first slices with respect to the vertical is adjustable by a user for a set of successive frames of said video sequence.

14. A non-transitory computer program product stored on a non-transitory computer readable medium, and comprising program code instructions executable by a processor for:
- obtaining a position of a first subset of pixels in an object in at least one frame of a video sequence according to selection data received from a user interface;
- obtaining a subset of pixels per frame of the video sequence, resulting in a plurality of subsets of pixels, by interpolating the position of the first subset of pixels to the video sequence;
- obtaining a first image from a first spatio-temporal slicing, wherein said first image is a horizontal concatenation of first slices comprising the subset of pixels for frames along said video sequence;
- obtaining a second image from a second spatio-temporal slicing, wherein said second image is a vertical concatenation of second slices comprising the subset of pixels for said frames along said video sequence, each of said second slices being orthogonal to the first slice of a same frame;
- obtaining on each of said first and second images a first and second boundary around the plurality of subsets of pixels by means of a contour detection method;
- obtaining a bounding form out of four points, around said object in each frame of the video sequence, wherein the coordinates of said four points in a frame t are obtained from the coordinates of the points located in the first and second boundary of the first and second image for that frame t.

* * * * *